(12) United States Patent
Talesky et al.

(10) Patent No.: US 7,861,633 B2
(45) Date of Patent: Jan. 4, 2011

(54) ANGULAR ADJUSTMENT APPARATUS FOR A MITER SAW

(75) Inventors: Mark S. Talesky, Huntley, IL (US); Wolfgang Hirschburger, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 972 days.

(21) Appl. No.: 10/875,119

(22) Filed: Jun. 23, 2004

(65) Prior Publication Data

US 2005/0284276 A1    Dec. 29, 2005

(51) Int. Cl.
*B26D 1/14* (2006.01)
*B27B 5/00* (2006.01)

(52) U.S. Cl. .................. 83/471.3; 83/473; 83/490; 83/581

(58) Field of Classification Search ............... 83/471.3, 83/472, 473, 477.1, 477, 477.2, 581, 490, 83/522.15, 526, 522.17; 108/104; 33/570; 74/813 R
See application file for complete search history.

(56) References Cited

U.S. PATENT DOCUMENTS

| | | | |
|---|---|---|---|
| 1,584,086 A | | 5/1926 | Fonda |
| 1,601,610 A | | 9/1926 | Carter |
| 1,697,873 A | | 1/1929 | Lambert |
| 1,758,623 A | | 5/1930 | Roth et al. |
| 2,249,814 A | | 7/1941 | Eastwood |
| 2,413,436 A | * | 12/1946 | Dawson ..................... 451/217 |
| 2,630,148 A | * | 3/1953 | Meade ......................... 30/393 |
| 2,819,654 A | * | 1/1958 | Coy ............................ 269/61 |
| 2,825,426 A | * | 3/1958 | Baxter ........................ 188/69 |
| 3,049,193 A | * | 8/1962 | Ingersoll ..................... 188/69 |
| 3,085,452 A | * | 4/1963 | Thompson ................... 74/822 |
| 3,213,740 A | * | 10/1965 | Wright et. al. ................ 83/564 |
| 3,615,068 A | * | 10/1971 | Edelstein ................. 248/349.1 |
| 3,722,602 A | * | 3/1973 | Rogers ........................ 173/32 |
| 4,467,684 A | * | 8/1984 | Thorsell .................... 83/404.1 |
| RE33,898 E | * | 4/1992 | Santos ........................ 114/210 |
| 6,513,412 B2 | * | 2/2003 | Young ....................... 83/471.3 |
| 2003/0024365 A1 | | 2/2003 | Chang |
| 2003/0200852 A1 | | 10/2003 | Romo |
| 2005/0262984 A1 | * | 12/2005 | Hetcher et al. ............. 83/471.3 |

FOREIGN PATENT DOCUMENTS

EP    1525938    4/2005

* cited by examiner

*Primary Examiner*—Ghassem Alie
(74) *Attorney, Agent, or Firm*—Greer, Burns & Crain, Ltd.

(57) ABSTRACT

An angular adjustment apparatus for a miter saw having a base and a turntable mounted to the base and rotatable around a generally centrally located axis, the turntable having a handle portion for rotating the turntable relative to the base. The apparatus includes an arcuate rack gear positioned on the base, and an elongated adjustment mechanism associated with the handle portion. The adjustment mechanism includes a pinion gear configured to engage the rack gear when brought into contact therewith, and a control wheel operatively connected to the pinion gear. The control wheel is rotatable around an axis concentric with the pinion gear and moveable along the concentric axis to cause the pinion gear to selectively engage and disengage the rack gear, wherein rotation of the control wheel while the pinion gear is engaged with the rack gear causes the turntable to rotate relative to the base.

19 Claims, 6 Drawing Sheets

ANGULAR ADJUSTMENT APPARATUS FOR A MITER SAW

FIELD OF THE INVENTION

The present invention relates generally to power tools, and more particularly to power miter saws.

BACKGROUND OF THE INVENTION

Conventional miter saws often provide an arrangement where the miter cut angle can be set at a number of predetermined positions. Typically, conventional miter saws include a stationary base to which a rotatable turntable is mounted, the base providing a plurality of detents that are configured to engage a lever attached to the turntable. The turntable due to the interaction of the lever and the detent on the base, may be set to pre-selected miter cut positions. By way of example, such an arrangement may provide detents at left and right 45 and 22.5-degree locations relative to a center detent that is perpendicular to a stationary fence that is formed or mounted to the base. In addition, some miter saws also provide for adjusting the miter cut position to a location other than the predetermined detent positions. However, due to the interaction between the lever and the detent, many of these prior art arrangements do not allow for rapid or macro adjustment of the miter cut angle over a range of angles in combination with a fine adjustment, or for fine adjustment that is near one of the pre-selected detent positions.

One known conventional miter saw discloses a detent system for macro adjustment of the miter saw to specific miter cut angles at the detent positions. Once positioned in a specific detent, a fine-adjustment mechanism enables fine adjustment of the miter saw within a few degrees of the detent position. However, the range of fine adjustment is not capable of operating over the entire range of miter cut angles, but instead is limited to specific regions within the entire range that are centered about the detents.

While miter saws have been developed which provide for rapid large scale rotation of the turntable relative to the base and also provide some limited fine adjustment relative to the pre-selected angular settings, all known examples of such saws fail to provide rapid large scale rotation of the turntable and fine adjustment over the entire range of miter cut angles, and are relatively complex and are not easily manipulated by a user.

SUMMARY OF THE INVENTION

The preferred embodiments of present invention relate to a miter saw having a base and rotating turntable mounted thereon, and a miter cut angle adjustment apparatus for providing large scale rotational movement as well as fine or incremental rotational movement of the turntable with respect to the base over the entire range of miter cut angles. The turntable includes an outwardly extending handle portion for rotating the turntable, which can be moved to set the miter saw at various angles over a specified range. The preferred embodiments enable both large scale and fine rotational movement of the turntable using adjustment mechanisms that are easily accessible and operable at or very near the handle portion at the front of the saw.

The adjustment apparatus includes an arcuate rack gear positioned on the base and an elongated adjustment mechanism associated with the handle portion that engages the rack gear to rotate the turntable. In the preferred embodiment, the elongated mechanism has a pinion gear configured to selectively engage the rack gear, and a control wheel that is operatively connected to the pinion gear. The control wheel is rotatable about an axis concentric with the pinion gear and moveable along the axis to cause the pinion gear to selectively engage and disengage the rack gear. When the pinion gear is engaged with the rack gear, rotation of the control wheel causes rotation of the pinion gear, which causes a rotation of the turntable relative to the base.

In an alternative preferred embodiment, a gearing system, such as a planetary gear set is provided to reduce the rotational speed of the pinion gear relative to the turning wheel to provide more precise adjustment of the miter cut angle of the saw.

DETAILED DESCRIPTION OF THE PREFERRED EMBODIMENT

Broadly stated, the present invention is directed to an angular adjustment apparatus for a cutting tool of the type which has a base and a turntable mounted to the base and being rotatable around a central axis, wherein the turntable has an outwardly extending handle portion for rotating the turntable relative to the base. The present invention is directed to an apparatus for use in connection with precision cutting of a work piece, and provides fine or incremental adjustment of the miter cut angle of the saw.

At least a portion of the angular adjustment apparatus is preferably configured to be mounted to the outwardly extending handle portion of the cutting tool so that the angular adjustment apparatus can engage the base and provide fine adjustment of the miter cut angle. The angular adjustment apparatus embodying the present invention has an arcuate rack gear positioned on the base that has a generally constant radius relative to the center axis, and an elongated adjustment mechanism that is operatively associated with the handle portion. The elongated adjustment mechanism is engageable with the arcuate rack gear, and when engaged can be adjusted to cause rotation of the turntable relative to the base so as to provide precise vernier adjustment of the miter cut angle for the cutting tool.

Figure 1:
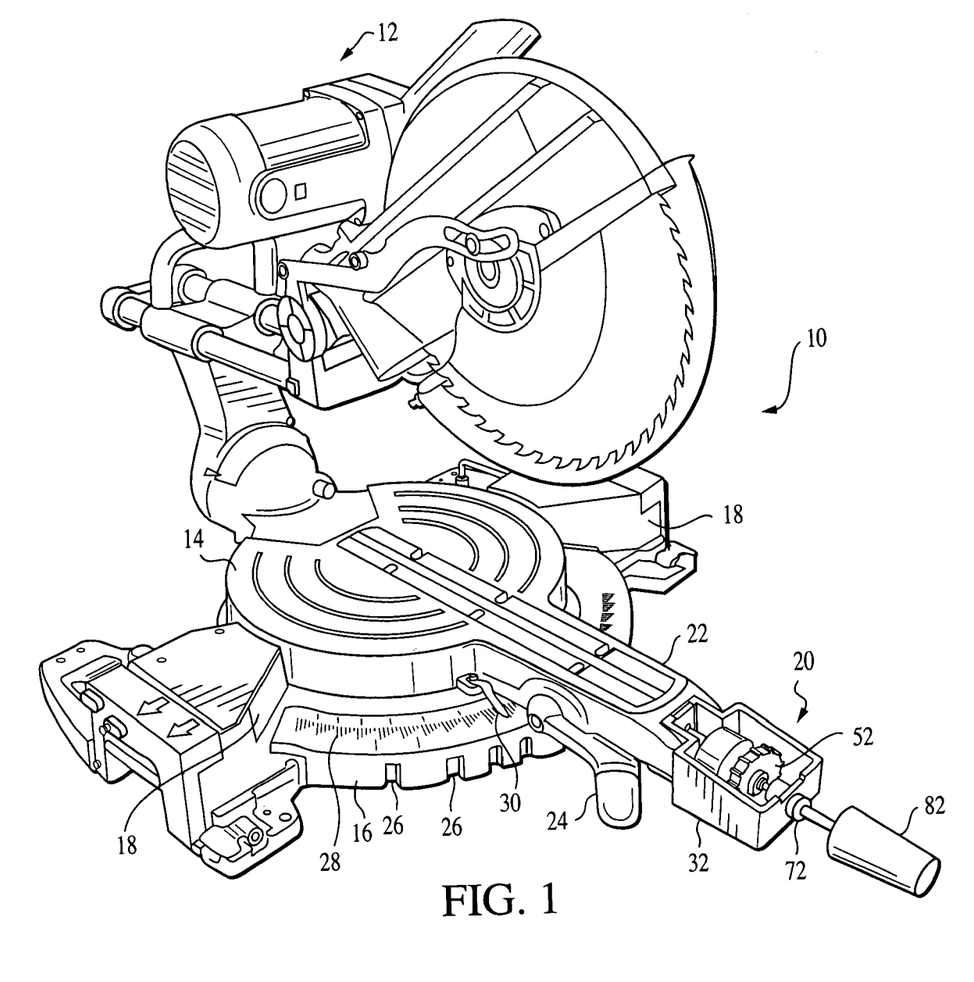
FIG. 1 is a perspective view of a first preferred embodiment of a miter saw having an angular adjustment apparatus.

Turning now to the drawings, there is illustrated in FIG. 1, in accordance with the first preferred embodiment of the present invention, a miter saw, indicated generally at 10, has a saw arm assembly indicated generally at 12 that is mounted to a turntable 14 that in turn is mounted to a stationary base 16. The miter saw arm assembly 12 is mounted to the turntable 14 so that rotation of the turntable 14 with respect to the base 16 in turn moves a saw blade to a desired miter cut angle. As shown in FIG. 1, the miter cut angle is at zero degrees or perpendicular to a fence (not shown), and the turntable 14 may be rotated relative to the base 16 toward either of the ends 18 of the base 16. In this manner, a range of miter cut angles is available to a user of the miter saw 10. The saw 10 also has an angular adjustment apparatus that is generally indicated at 20 that is configured to set the miter cut angle at several preset positions as well as many other positions that can be finely adjusted virtually anywhere along the entire path of rotational movement.

The turntable 14 has an outwardly extending handle portion 22 to which a bevel locking lever 24 is secured. The lever 24 is operable to lock the turntable 14 relative to the base 16 at a selected bevel angle of cut, as is known to those skilled in the art. A plurality of detents 26 are positioned about the base 16 to correspond to common miter cut angles such as 0° as well as left and right 22.5°, 45° etc., which are identified by markings 28. An indicator 30 attached to the turntable 14 can be used in conjunction with the markings 28 to provide a visual indication of the miter cut angle of the saw 10, throughout a range of 150°, for example.

Figure 2:
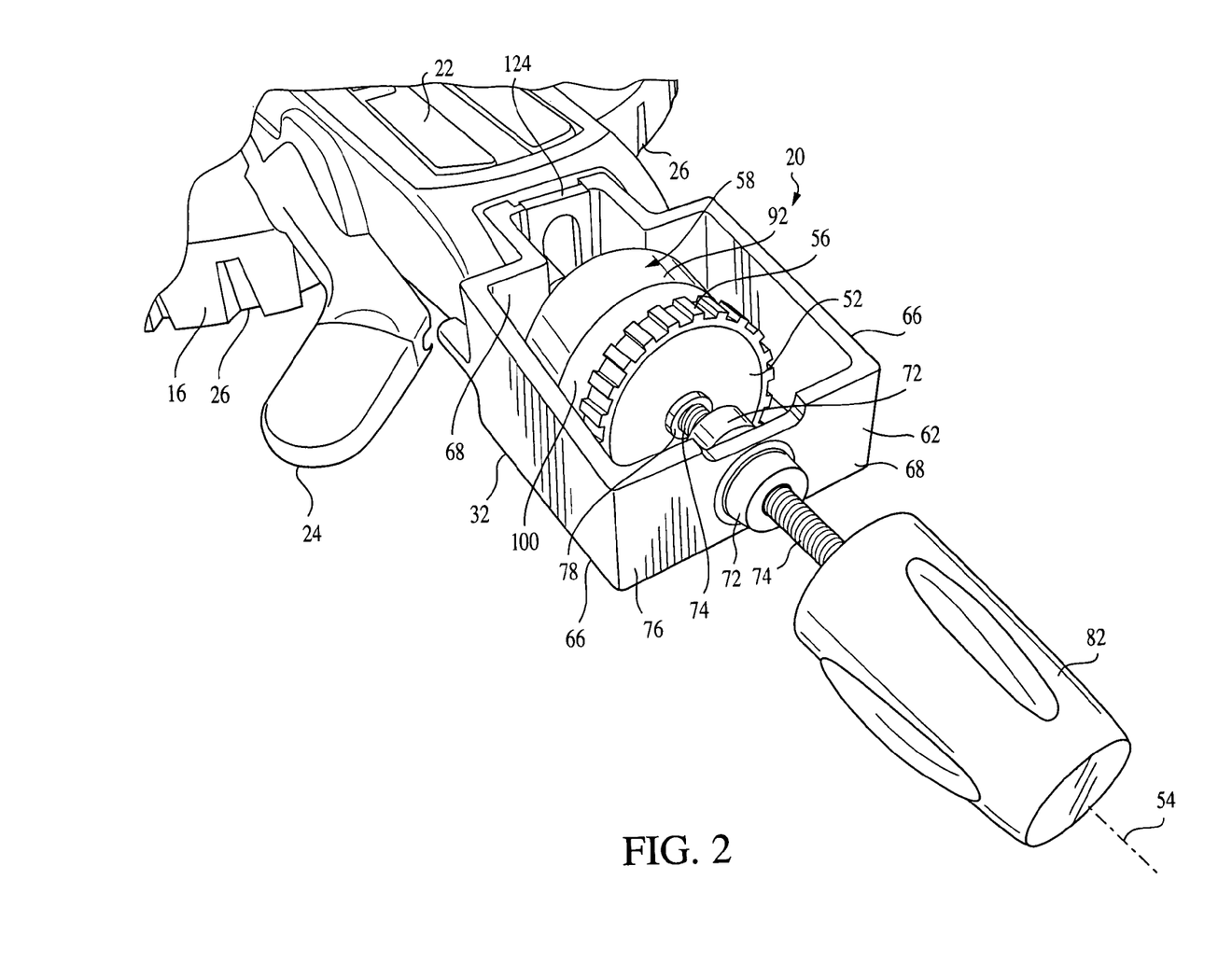
FIG. 2 is a generally front perspective view of a portion of the adjustment apparatus shown in FIG. 1.
Figure 3:
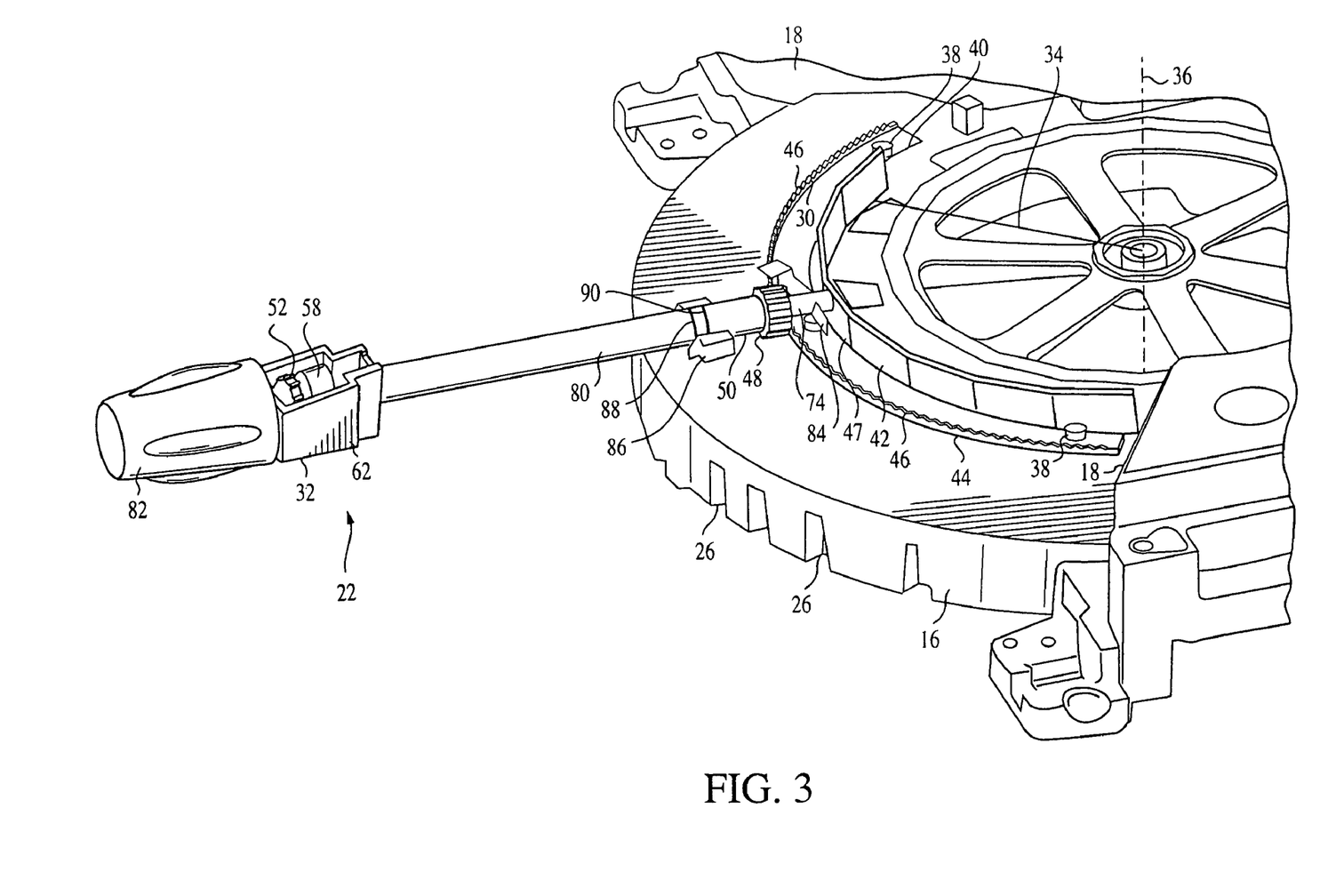
FIG. 3 is a right front perspective view of the adjustment apparatus shown in FIG. 1 with the turntable removed.

FIGS. 1-3 illustrate the adjustment apparatus 20, which includes an arcuate rack gear 30 (FIG. 3) and an elongated adjustment mechanism 32. FIG. 3 shows the base 16 with the turntable 14 removed. The arcuate rack gear 30 is positioned on the base 16 and has a generally constant radius 34 relative to a center axis 36 of the base 16. In this regard, the arcuate rack gear 30 can be attached to the base 16 or integrally formed therewith. The turntable 14 is mounted to the base 16 and rotatable around the center axis 36. The elongated adjustment mechanism 32 is associated with the outwardly extending handle portion 22 of the turntable 14 and is configured to engage the arcuate rack gear 30 to cause fine or vernier adjustment of the angular position of the turntable 14 relative to the base 16.

In this regard, the preferred embodiment of the present invention has an angular adjustment apparatus that can accurately make angular adjustments of less than a single degree over the full range of miter cut angles. In particular, an advantage of the angular adjustment mechanism is that fine adjustment of the miter cut angles may occur at any position within the miter saw operating range, including angles that are closely adjacent to the detents 26 of the base 16.

In the first preferred embodiment, the arcuate rack gear 30 is secured to the base 16 by a plurality of screws 38 and has an inner edge 40 adjacent a rim 42 of the base 16 and an outer edge portion 44 that has a plurality of gear teeth 46. The miter cut angle of the saw 10 is principally determined by the arc length of the rack gear 30 and ends 18 of the base 16. The rim 42 can be engaged by a locking member on an outer surface 47 to frictionally prevent movement of the elongated mechanism, and hence the turntable 14, with respect to the base 16.

As best shown in FIG. 3 the elongated adjustment mechanism 32 associated with the handle portion 22 includes a pinion gear 48 on an inner end portion 50 of the elongated adjustment mechanism 32. The pinion gear 48 is configured to engage the teeth 46 of the rack gear 30 when brought into contact therewith, and can do so at any position along the length of the rack gear 30.

The elongated adjustment mechanism 32 preferably includes a control wheel 52 positioned on an outer end portion of the elongated adjustment mechanism 32. The control wheel 52 is operatively connected to the pinion gear 48 such that rotation of the control wheel 52 causes rotation of the pinion gear 48. That is, the control wheel 52 is rotatable around an axis 54 (FIG. 2) concentric with the pinion gear 48 and is axially moveable with the pinion gear 48 to cause it to selectively engage and disengage the rack gear 30. Moreover, rotation of the control wheel 52 can be in a clockwise or counterclockwise direction, to selectively move the turntable 14 in opposite directions along the rack gear 30.

The control wheel 52 preferably includes a serrated outer surface 56 for facilitating grasping of the control wheel 52 by a user during rotation of the control wheel 52. In a disengaged position wherein the control wheel 52 is at a furthermost position from the base 16, the pinion gear 48 does not engage the rack gear 30 (as shown in FIG. 3), and rotation of the control wheel 52, while rotating the pinion gear 48, does not provide any rotational movement of the turntable 14 relative to the base 16. However, when the pinion gear 48 moved closer to the base 16 in an engaged position, wherein the pinion gear 48 is in contact with the rack gear 30, then rotation of the control wheel 52 causes incremental rotation of the turntable 14.

The elongated adjustment mechanism 32 of the present embodiment has a gear reduction mechanism, indicated generally at 58, that is intermediate the pinion gear 48 and the control wheel 52. As is known to those skilled in the art, the gear reduction mechanism 58 reduces the turn ratio between the pinion gear 48 and the control wheel 52. For example, a 1 to 1 turn ratio can be adjusted to, for example, a 9 to 1 turn ratio. In this manner, nine rotations of the control wheel 52 are required to cause a single rotation of the pinion gear 48, which facilitates precision rotational positioning of the miter cut angle of the saw 10.

Turning now to FIGS. 1-4, the gear reduction mechanism 58 of the present embodiment is a single-stage planetary gear assembly 60. However, a two-stage planetary gear assembly, or other gear assemblies such as worm gears and the like, is envisioned as being usable with the present invention. The planetary gear assembly 60 is slidably moveable within a bracket 62 with the control wheel 52 as the pinion gear 48 is moved between the engaged and disengaged positions. The bracket 62 is secured to the handle portion 22 by one or more fasteners (not shown), or is formed as a part of the handle portion 22. Side walls 66 and 68 of the bracket 62 are sufficiently separated from one another so as to allow movement of the gear reduction mechanism 58 and control wheel 52 along the concentric axis 54, as well as rotation of the control wheel 52.

Figure 5:
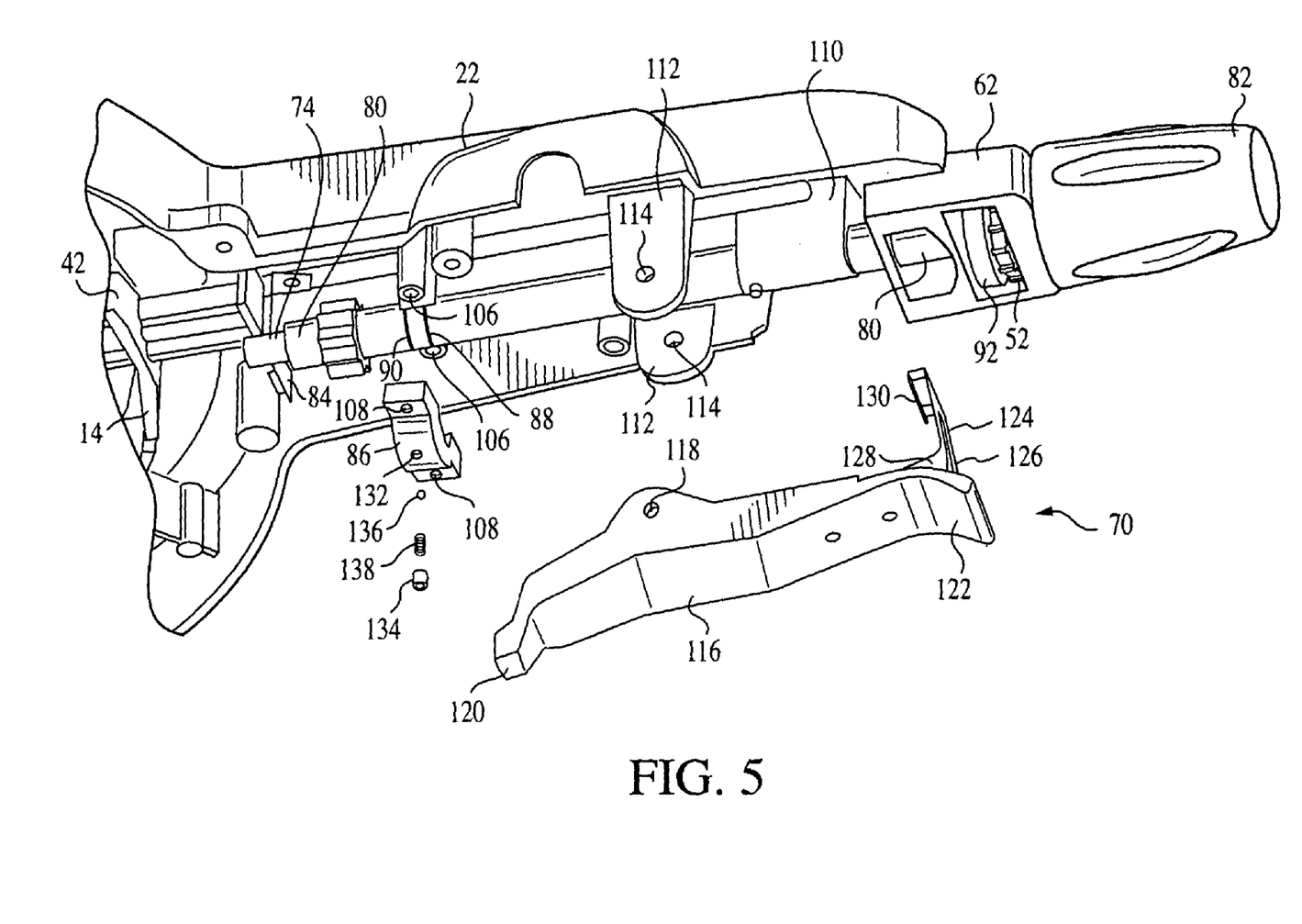
FIG. 5 is a partially exploded bottom perspective view of the adjustment apparatus of FIG. 1.

As shown in FIG. 5, a detent locking mechanism, indicated generally at 70, is provided to lock the turntable 14 in the respective detents for the common angular positions when no fine adjustment of the miter cut angle is required. An annular female threaded portion 72 configured for receiving a male threaded shaft 74 is provided at the outer end 76 of the bracket 62.

One end of the threaded shaft 74 screws through the threaded portion 72 and extends through the bracket 62 and through a center opening in an input shaft 78 as well as through a similar opening in the planetary gear assembly 60 and the output shaft 80 to frictionally engage the rim 42 when in a locked position. The turntable 14 cannot rotate relative to the base 16 when the threaded shaft 74 is tightened against the rim 42. A knob 82 is connected to the threaded shaft 74 so that a user can rotate it to lock and unlock the turntable 14 relative to the base 16. A guide 84 is attached to the base 16 intermediate of the pinion gear 48 and the rim 42 to hold the threaded shaft 74 for contacting the rim 42. Preferably, the guide 84 is attached to the base 16.

Rotation of the input shaft 78 operates the planetary gear assembly 60, which causes rotation of the output shaft 80 and the pinion gear 48. However, rotation of the pinion gear 48 does not result in rotation of the turntable 14 with respect to the base 16 unless the control wheel 52 is moved to the engaged position, wherein the pinion gear 48 engages the rack gear 30. A bushing 86 is also provided for guiding the output shaft 80 during movement along the axis 54 between the disengaged position, indicated by a first groove 88 on the output shaft 80, and the engaged position, indicated by a second groove 90 on the output shaft 80.

Figure 4:
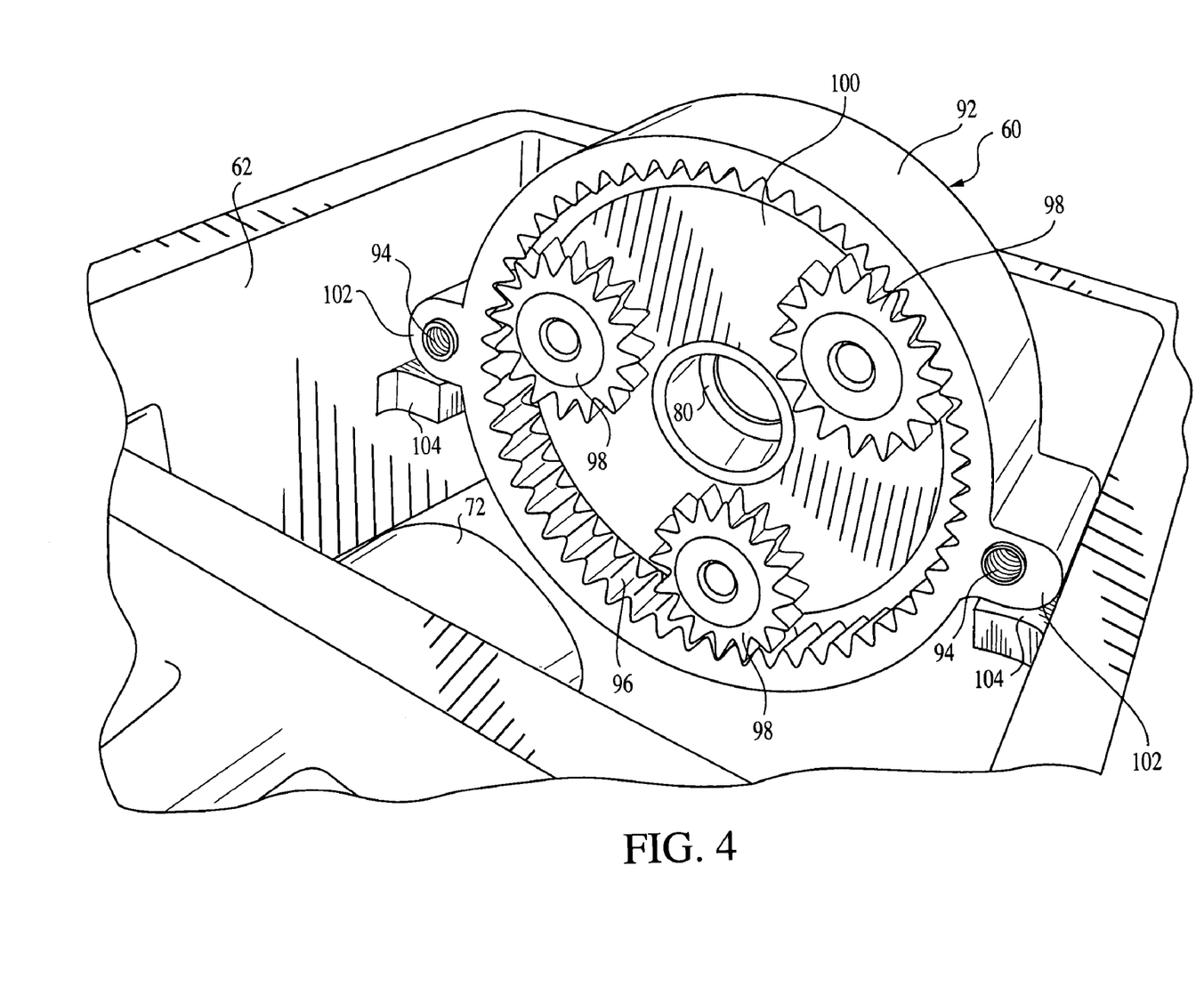
FIG. 4 is a perspective view of the single stage planetary gear system of the adjustment apparatus of FIG. 1 with a planetary gear casing cover removed.

Turning now to FIGS. 2 and 4, the gear reduction mechanism 58 includes a planetary gear casing 92 that has a pair of threaded bores 94 for attaching a cover (not shown) to the planetary gear casing 92 via fasteners (not shown). The planetary gear casing 92 has an inner surface that is formed as a ring gear 96. The ring gear 96 engages at least one of a set of three planetary gears 98, and preferably each of the planetary gears 98 that are connected to a carrier plate 100, as is known to those skilled in the art of gear design. The carrier plate 100 connects to the output shaft 80, and rotates with the output shaft 80 when the planetary gears 98 are rotated since the ring gear 96 does not rotate about the concentric axis 54.

The planetary gear casing 92 has a pair of elongated ends 102 that engage ledges 104 of the bracket 62. More specifically, the planetary gear casing 92 is moveable along the concentric axis 54 such that the elongated ends 102 slide relative to the ledges 104 when the control wheel 52 and pinion gear 48 are moved between the engaged and disengaged positions.

Turning now to FIG. 5, a partial exploded view of the underside of the outwardly extending handle portion 22 connected to the base 16 is shown. The outwardly extending handle portion 22 includes a pair of threaded bores 106 configured for receiving fasteners (not shown) that are passed through apertures 108 of the bushing 86 to secure the bushing 86 to the outwardly extending handle portion 22. The outwardly extending handle portion 22 also includes a hollowed output shaft guiding member 110 to guide the output shaft 80. Furthermore, a pair of arms 112 having apertures 114 configured to receive fasteners (not shown) that fasten a detent locking lever 116 having apertures 118 (one shown) facilitate locking of the turntable 14 relative to the base 16 in the various detents 26.

In operation, the detent locking lever 116 is pivotally attached via apertures 114 and 118 to the outwardly extending handle portion 22 and is biased by a spring or other type of biasing member (not shown) to have an end portion 120 of the detent locking lever 116 engage the detents 26 of the base 16. Another end portion 122 is configured for gripping by a user to pivot the detent locking lever 116, which disengages the end 120 from a detent 26 so that the turntable 14 can be rotated relative to the base 16. A clip member 124 includes a slot 126 that the output shaft 80 passes through, when assembled, and has one end 128 attached to the end portion 122 of the detent locking lever 116 and another end 130 that is configured for engaging the bracket 62. In particular, the clip member 124 is formed so as to engage one of the side walls 68 of the bracket 62 and pivot the detent locking lever 116 in a disengaged position so that no locking of the turntable 14 using the detent locking lever 116 occurs. When the detent locking lever 116 is in the disengaged position, the knob 82 can be easily rotated to have the threaded shaft 74 engage the rim 42 to lock the turntable 14 and prevent rotation relative to the base 16. Alternatively, when the pinion gear 48 is engaged with the rack gear 30, the turntable 14 is also locked in position relative to the base 16 unless the control wheel 52 is rotated.

In order to guide the outer shaft 80 between the first disengaged groove 88 and the second engaged groove 90, the bushing 86 has a female threaded bore 132 for receiving a male threaded set screw 134. A ball bearing 136 and then a spring 138 are positioned in the bore 132, and then the set screw 134 is threaded into the bore 132 to bias the spring 138 against the ball bearing 136. The ball bearing 136 rides in the first or second grooves 88, 90 depending on the position of the control wheel 52 and gear reduction mechanism 58 in the bracket 62. Furthermore, the spring 138 is sufficiently biased so that the spring 138 can be further biased during movement between the first and second grooves 88, 90. The grooves 88, 90 therefore provide a detent for the spring biased ball bearing 136 so that the user feels completion of movement between the engaged and disengaged positions.

Figure 6:
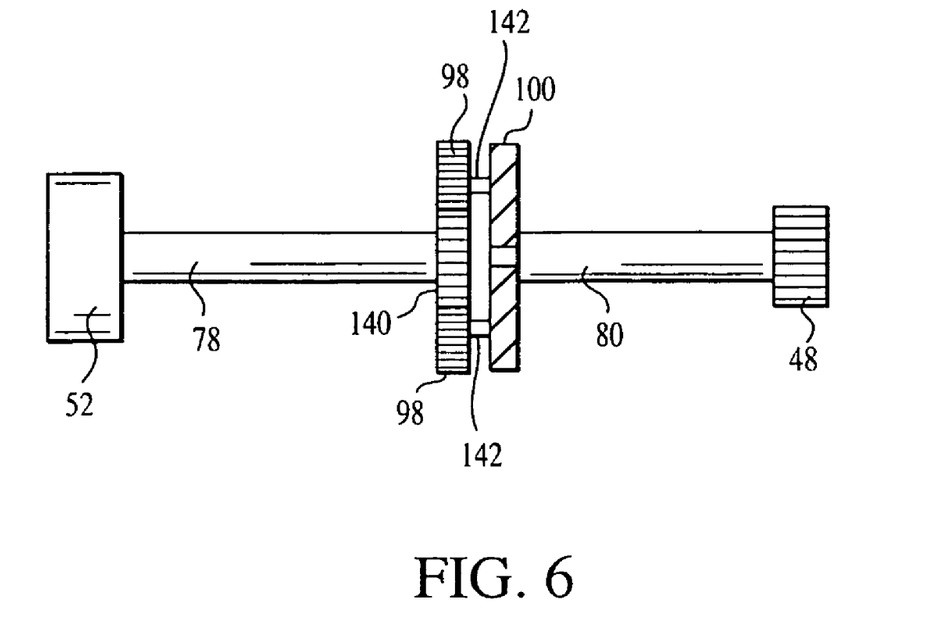
FIG. 6 is a cross-sectional view of the turning wheel, pinion gear, and portions of the planetary gear set of the adjustment apparatus of FIG. 1, with the planetary gear set ring gear removed.

FIG. 6 illustrates a simplified cross-sectional view of the control wheel 52, input shaft 78, portions of the planetary gear assembly 60, output shaft 80, and pinion gear 48. A sun gear 140 is attached to an end of the input shaft 78 and it engages the planetary gears 98, which are attached to the carrier plate 100 via axles 142, and rotates in conjunction with the control wheel 52. The rotational motion of the sun gear 140 is transferred by the planetary gears 98 to the carrier plate 100, and therefore the output shaft 80 and the pinion gear 48 attached to the output shaft 80. As is known to those skilled in the art, the particular gear reduction ratio is dependent upon the size and/or type of gears, including the pinion gear 48, whether additional stages of planetary gears are included in the gear reduction mechanism 58, etc.

In a second preferred embodiment of the invention, the elongated adjustment mechanism includes a pinion gear on an inner end thereof that is configured to engage the arcuate rack gear when brought into contact therewith, and a control wheel. The control wheel is positioned on an outer end portion of the elongated adjustment mechanism and is operatively connected to the pinion gear. In operation, the control wheel is rotatable around an axis concentric with the pinion gear and moveable along the concentric axis to cause the pinion gear to selectively engage and disengage the arcuate rack gear, wherein rotation of the control wheel while the pinion gear is engaged with the arcuate rack gear causing the turntable to rotate relative to the base.

Figure 7:
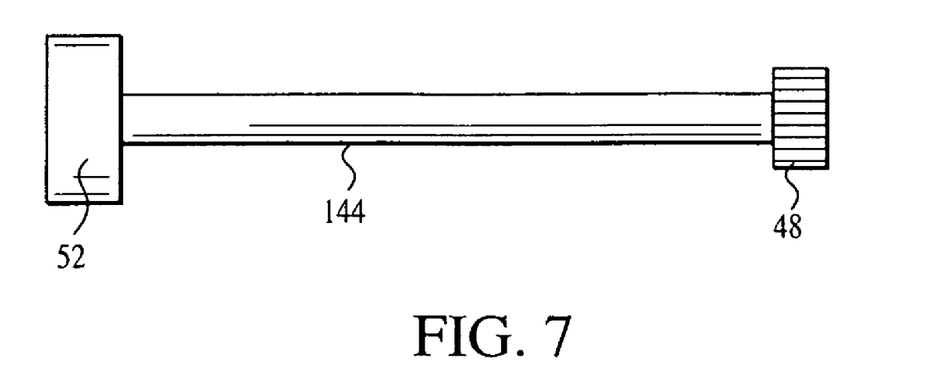
FIG. 7 is a side view of a second preferred embodiment where the turning wheel and pinion gear are connected by a shaft, the planetary gear set not being present.

Turning now to FIG. 7, a side view of a combined input/output shaft of the second preferred embodiment of the angular adjustment apparatus 20 has like parts identified with identical reference numerals. In this embodiment, the planetary gear mechanism of FIG. 6 is eliminated and replaced with a common shaft 144 that performs as both an input shaft and an output shaft. Accordingly, rotation of the turning wheel 52 provides a one to one turn ratio with the pinion gear 48. Moreover, it is envisioned by this embodiment that the size of the pinion gear 48 affects the precision of the rotation of the turntable 14 relative to the base 16.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. An angular adjustment apparatus for a miter saw of the type which has a base for supporting the saw and a turntable mounted to the base by a pivot connection defining a generally centrally located axis, the turntable having an outwardly extending handle portion configured to enable a user to manually rotate the turntable relative to the base, said adjustment apparatus comprising:

an arcuate rack gear positioned on the base and having a generally constant radius relative to the centrally located axis; and an elongated adjustment mechanism associated with the handle portion, said mechanism comprising:

a pinion gear on an inner end portion configured to engage said rack gear when brought into contact therewith; and a manually rotatable control wheel on an outer end portion operatively connected to said pinion gear, said control wheel being rotatable around an axis concentric with said pinion gear and moveable along said concentric axis to cause said pinion gear to selectively engage and disengage said rack gear, rotation of said control wheel while said pinion gear is engaged with said rack gear causing the turntable to rotate relative to the base.

2. The adjustment apparatus as defined in claim 1 wherein said adjustment mechanism includes a gear reduction mechanism intermediate said pinion gear and said control wheel, said gear reduction mechanism reducing the amount of rotation of said pinion gear relative to the amount of rotation of said control wheel.

3. The adjustment apparatus as defined in claim 2 wherein said gear reduction mechanism is a planetary gear set having an input shaft connected to said control wheel and an output shaft connected to said pinion gear.

4. The adjustment apparatus of claim 3 further comprising at least one bushing configured to connect said output shaft to the handle portion.

5. The adjustment apparatus as defined in claim 2 wherein said handle portion includes a bracket having said gear reduction mechanism slidably engageable therewith.

6. The adjustment apparatus as defined in claim 5 wherein said bracket has an end portion configured for receiving a rod therethrough for locking said table to the base.

7. The adjustment apparatus as defined in claim 6 further comprising a knob threadedly connected to said bracket, wherein rotation of said knob causes one of engagement and disengagement of said rod against a surface of the base.

8. The adjustment apparatus as defined in claim 2 wherein said gear reduction mechanism is configured for receiving a rod therethrough for locking the turntable to the base.

9. The adjustment apparatus of claim 8, further comprising a guide attached to the base and configured for directing an end of said rod toward the base.

10. The adjustment apparatus as defined in claim 1 wherein said adjustment mechanism further comprises a shaft for connecting said control wheel to said pinion gear.

11. The adjustment apparatus of claim 1 further comprising:

a threaded member;

a bushing configured for receiving said threaded member therethrough;

a ball bearing engageable with said threaded member and a pair of grooves encircling a shaft to which said pinion gear is attached, said grooves defining said engaged and disengaged positions of said pinion gear and said rack gear.

12. The adjustment apparatus as defined in claim 1 wherein rotation of said control wheel causes rotary motion of the turntable relative to the base substantially along the full range of angular movement.

13. A miter saw assembly, comprising:

a base;

a turntable mounted to said base and being rotatable around a generally centrally located axis, said turntable having an outwardly extending handle portion for rotating said turntable relative to said base;

a cutting attached to said turntable; and an angular adjustment mechanism comprising:

an arcuate rack gear positioned on said base and having a generally constant radius relative to said centrally located axis; and an elongated adjustment mechanism associated with said handle portion, said mechanism comprising:

a pinion gear on an inner end portion thereof configured to engage said rack gear when brought into contact therewith; and a control wheel on an outer end portion operatively connected to said pinion gear, said control wheel being rotatable around an axis concentric with said pinion gear and moveable along said concentric axis to cause said pinion gear to selectively engage and disengage said rack gear, rotation of said control wheel while said pinion gear is engaged with said rack gear causing said turntable to rotate relative to said base.

14. The adjustment apparatus as defined in claim 13 wherein said adjustment mechanism includes a planetary gear set intermediate said pinion gear and said control wheel, said planetary gear set reducing the amount of rotation of said pinion gear relative to the amount of rotation of said control wheel.

15. The adjustment apparatus as defined in claim 14 wherein said gear reduction mechanism is a planetary gear set has an input shaft connected to said control wheel and an output shaft connected to said pinion gear.

16. The adjustment apparatus as defined in claim 15 wherein said planetary gear set and output shaft are configured for receiving a rod therethrough for locking said turntable to said base.

17. An angular adjustment apparatus for a miter saw of the type which has a base for supporting the saw and a turntable rotatably mounted to the base by a center pivot connection that defines a generally centrally located axis, the turntable having an outwardly extending handle portion configured to enable a user to manually rotate the turntable relative to the base, said adjustment apparatus comprising:

an arcuate rack gear positioned on the base and having a generally constant radius relative to the centrally located axis; and an elongated adjustment mechanism associated with the handle portion, said mechanism comprising:

a pinion gear on an inner end portion configured to engage said rack gear; and a manually rotatable control wheel on an outer end portion operatively connected to said pinion gear, whereby rotation of said control wheel causes the turntable to rotate relative to the base.

18. A miter saw assembly comprising:

a base for supporting the saw assembly;

a turntable rotatably mounted to said base by a pivot connection defining a generally centrally located axis, said turntable having an outwardly extending handle portion configured to enable a user to manually rotate said turntable relative to said base;

a cutting tool attached to said turntable; and an angular adjustment mechanism comprising:

an arcuate rack gear positioned on said base and having a generally constant radius relative to said centrally located axis; and an elongated adjustment mechanism associated with said handle portion, said mechanism comprising:

a pinion gear on an inner end portion thereof configured to engage said rack gear; and a manually rotatable control wheel on an outer end portion operatively connected to said pinion gear, said control wheel being rotatable to cause said turntable to rotate relative to said base.

19. A miter saw assembly comprising:

a base for supporting the saw assembly;

a turntable rotatably mounted to said base by a pivot connection defining a generally centrally located axis, said turntable having an outwardly extending handle portion configured to enable a user to manually rotate said turntable relative to said base;

a cutting tool attached to said turntable; and an angular adjustment mechanism comprising:

an arcuate rack gear positioned on said base and having a generally constant radius relative to said centrally located axis; and an elongated adjustment mechanism associated with said handle portion, said mechanism comprising:

a pinion gear on an inner end portion thereof configured to engage said rack gear;

a manually rotatable control wheel on an outer end portion and being operatively connected to said pinion gear, said control wheel being rotatable to cause said turntable to rotate relative to said base.

* * * * *